No. 717,976. PATENTED JAN. 6, 1903.
J. M. DODGE.
SPROCKET WHEEL FOR DRIVE CHAINS.
APPLICATION FILED NOV. 7, 1901.
NO MODEL. 2 SHEETS—SHEET 1.
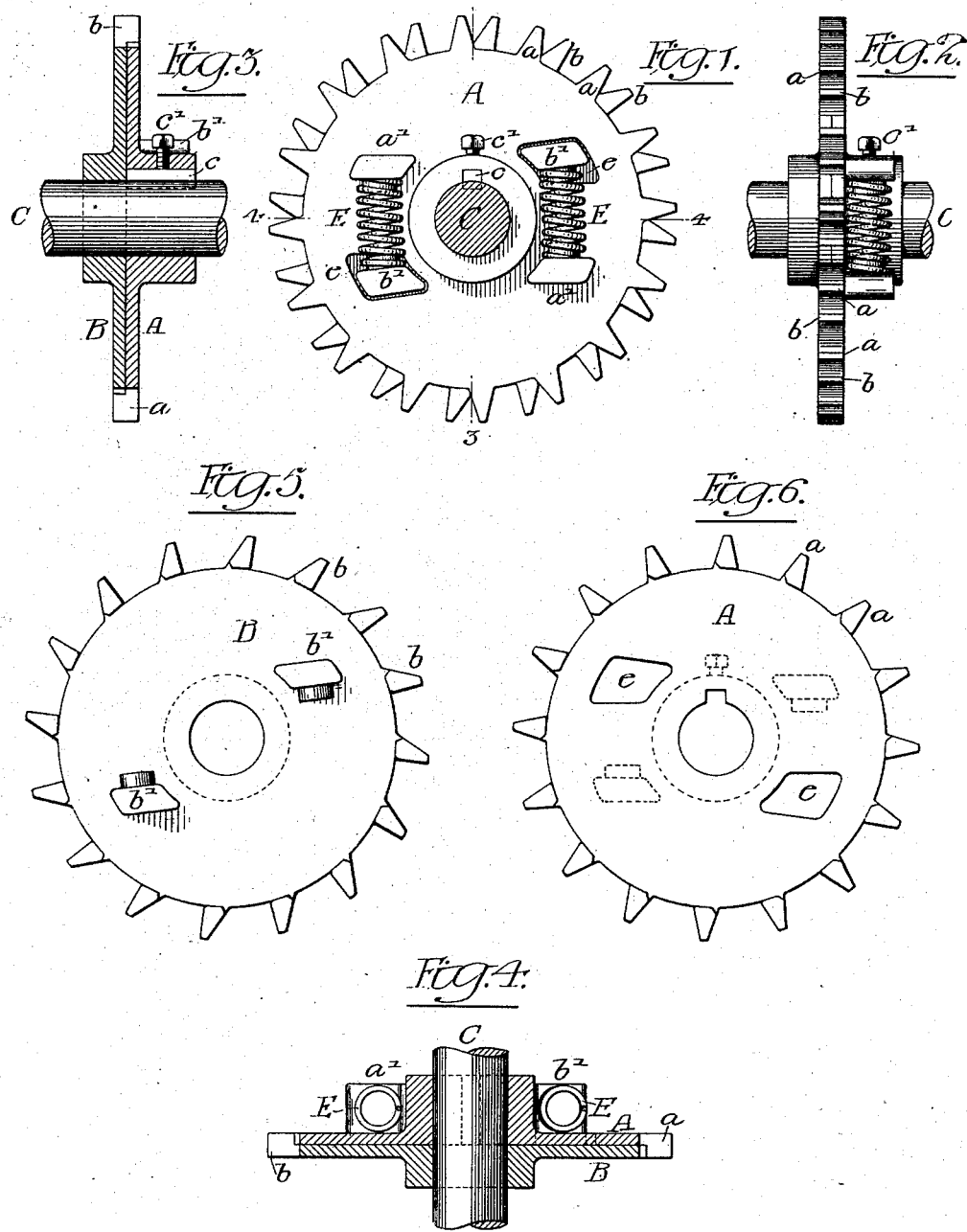
Witnesses:-
Inventor:-
James M. Dodge,
by his Attorneys;

No. 717,976. PATENTED JAN. 6, 1903.
J. M. DODGE.
SPROCKET WHEEL FOR DRIVE CHAINS.
APPLICATION FILED NOV. 7, 1901.
NO MODEL. 2 SHEETS—SHEET 2.

Witnesses:—

Inventor:—
James M. Dodge,
by his Attorneys;

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

SPROCKET-WHEEL FOR DRIVE-CHAINS.

SPECIFICATION forming part of Letters Patent No. 717,976, dated January 6, 1903.

Application filed November 7, 1901. Serial No. 81,445. (No model.)

*To all whom it may concern:*

Be it known that I, JAMES M. DODGE, a citizen of the United States, residing in Philadelphia, Pennsylvania, have invented certain Improvements in Sprocket-Wheels for Drive-Chains, of which the following is a specification.

My invention relates to certain improvements in the sprocket-wheels of drive-chains, particularly those adapted to receive the ordinary open-link chain.

The object of my invention is to take up all slack of the said chain by means of the yielding teeth of the wheel, as fully described hereinafter.

In the accompanying drawings, Figure 1 is a side view of my improved sprocket-wheel. Fig. 2 is a side view. Fig. 3 is a section on the line 3 3, Fig. 1. Fig. 4 is a section on the line 4 4, Fig. 1. Figs. 5 and 6 are views of the two parts of the wheel separated, and Figs. 7 and 8 are diagram views.

A and B are two disks which form the wheel. The disk A has a series of teeth $a$, inclined on the working face, and the disk B has a series of teeth $b$, also having one face inclined. When the two disks are placed face to face, as in Fig. 2, the teeth of one disk alternate with the teeth of the other disk, as in Fig. 1. Each tooth projects from the inner face, so as to extend into the space between the teeth of the adjoining disk, as illustrated in Figs. 3 and 4, so that when the two parts are assembled there is simply one series of teeth. In the present instance the disk A is the driving-disk and is secured to the shaft C by means of a key $c$ and set-screw $c'$, and the disk B is the take-up and is free to rotate on the shaft to a limited extent and is held in place by means of a collar or other device.

Projecting from the face of the disk A are two lugs $a'$ $a'$, and projecting from the inner face of the disk B are two lugs $b'$ $b'$, which extend through openings $e$ $e$ in the disk A. Between the lugs $a'$ and $b'$ are springs E, which tend to force the lugs apart, forcing the teeth of the disk B toward the teeth of the disk A.

Figure 7:
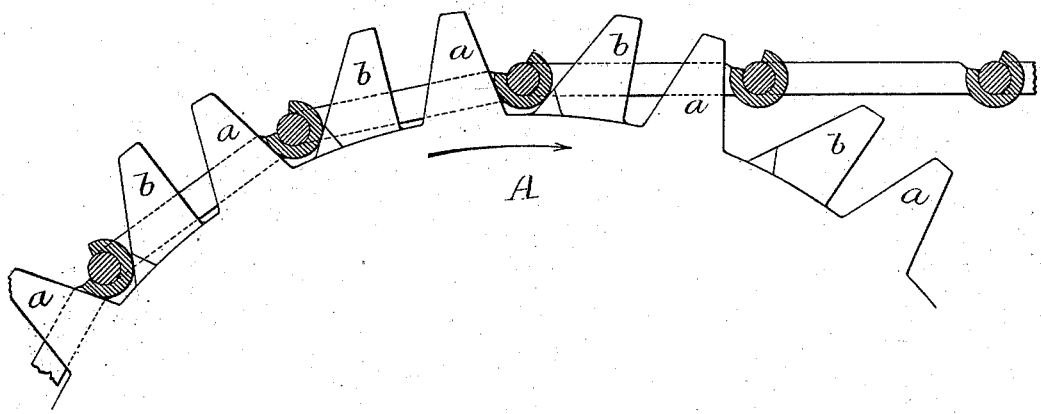
Figure 8:
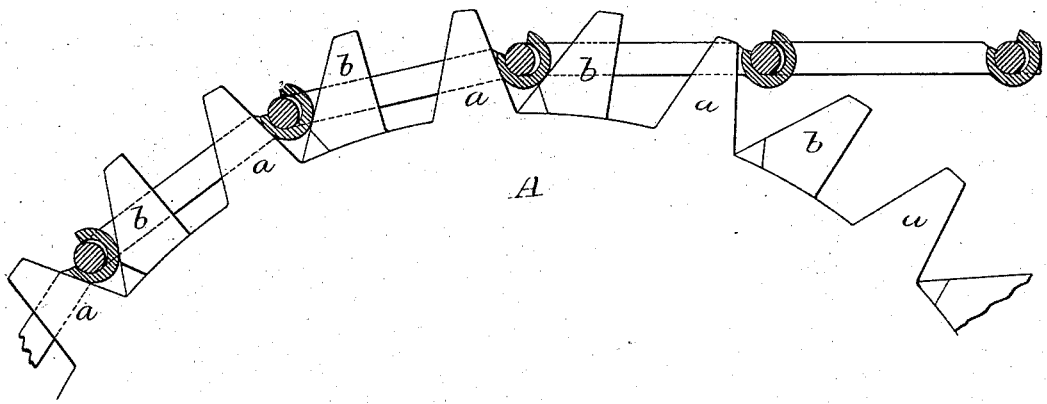

The pivots of the chains enter the space between the two inclined bearing-faces of the teeth of the two sections of the wheel and accommodate themselves to the wheel, and when both the chain and wheel are new the distance between the center of the pivots of the links will be such as to cause the chain to find its seat upon the wheel and separate the two sections until it seats at the proper bearing, as in Fig. 7, the spring-section yielding sufficiently to allow for the proper seating of the chain. As the chain and the teeth of the wheel wear and the chain begins to elongate then the pitch-circle of the chain will be increased, and the chain will seek another bearing farther from the center of the wheel, as in Fig. 8, and the spring-section B will move toward the pivot of the chain and take up the lost motion which would otherwise occur between the wheel and the chain, so that by this arrangement I am enabled to make a comparatively noiseless driving-gear with the use of an ordinary pivoted-link chain.

I claim as my invention—

1. A sprocket-wheel made in two parts, one part movable in respect to the other part, each part having a series of laterally-projecting teeth, the teeth of one part projecting into the spaces between the teeth of the other part, substantially as described.

2. A sprocket-wheel made in two parts, one part movable in respect to the other part, each part having a series of laterally-projecting teeth, the teeth of one part extending into the spaces between the teeth of the other part, the teeth being arranged in pairs, the working faces of each pair facing each other, with a yielding means for drawing the teeth of each pair toward each other, substantially as described.

3. The combination of a sprocket-wheel made in two parts, a shaft to which one of said parts is secured, the other part being loose on the shaft, teeth on each part having laterally-projecting portions, the projecting teeth on one part extending into the spaces between the teeth of the other part, the teeth being arranged in pairs, the working faces of each pair facing each other, with a spring tending to draw the teeth of each pair together, substantially as described.

4. The combination of a shaft, a sprocket-wheel made in two parts, each having teeth, the teeth of one part having lateral projections which extend into the spaces between the teeth of the other part, each tooth having an inclined working face, the teeth being arranged in pairs forming V-shaped recesses for the pivots of the chain, and a spring between the two parts of the sprocket-wheel for drawing the teeth of each pair together, substantially as described.

5. The combination of a shaft C, a sprocket-wheel made in two parts A and B, the part A being secured to the shaft, the part B loose on the shaft, the part A having lugs on one side and openings, the part B having lugs extending through the openings, springs mounted between the lugs, sprocket-teeth on each part, the teeth of one part projecting laterally and extending into the spaces between the teeth of the other part, the teeth being arranged in pairs, the working faces of each pair being inclined and forming a V-shaped recess for the reception of the chain, substantially as described.

In testimony whereof I have signed my name to this specification in the presence of two subscribing witnesses.

JAMES M. DODGE.

Witnesses:
WILL. A. BARR,
JOS. H. KLEIN.